(12) United States Patent
Cordani

(10) Patent No.: US 10,240,041 B2
(45) Date of Patent: Mar. 26, 2019

(54) FIRE SUPPRESSION FLUID DISPENSING DEVICE

(71) Applicant: GelTech Solutions, Inc., Jupiter, FL (US)

(72) Inventor: Peter Cordani, Palm Beach Gardens, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 0 days.

(21) Appl. No.: 15/153,015

(22) Filed: May 12, 2016

(65) Prior Publication Data

US 2016/0354624 A1   Dec. 8, 2016

Related U.S. Application Data

(60) Provisional application No. 62/160,336, filed on May 12, 2015.

(51) Int. Cl.

| A62C 13/66 | (2006.01) |
|---|---|
| C08L 101/16 | (2006.01) |
| A62D 1/00 | (2006.01) |
| C08L 101/14 | (2006.01) |
| A62C 3/16 | (2006.01) |
| A62C 5/033 | (2006.01) |
| A62C 3/02 | (2006.01) |

(52) U.S. Cl.
CPC ............ *C08L 101/16* (2013.01); *A62C 13/66* (2013.01); *A62D 1/0064* (2013.01); *C08L 101/14* (2013.01); *A62C 3/0221* (2013.01); *A62C 3/16* (2013.01); *A62C 5/033* (2013.01); *C08L 2201/06* (2013.01); *C08L 2201/54* (2013.01)

(58) Field of Classification Search
CPC ...... C08L 101/16; C08L 101/14; A62C 13/66; A62C 3/0221; A62D 1/0064
USPC ............................................................ 169/9
See application file for complete search history.

(56) References Cited

U.S. PATENT DOCUMENTS

| 3,464,497 A | * | 9/1969 | Globerman et al. ........................ A62C 99/009 169/19 |
| 3,517,746 A | * | 6/1970 | Balmes, Sr. ......... A62C 13/006 169/61 |
| 3,653,443 A | * | 4/1972 | Dockery ................ A62C 3/006 169/19 |

(Continued)

OTHER PUBLICATIONS

Afework et al., Electrical conductivity, May 11, 2018, Energy Ediucation University of Calgary, http://energyeducation.ca/encyclopedia/Electrical_conductivity.*

*Primary Examiner* — Chee-Chong Lee
(74) *Attorney, Agent, or Firm* — McHale & Slavin, P.A.

(57) ABSTRACT

Disclosed is an assembly for discharging hydrated super absorbent polymer into a confined space for protection of a lineman or firefighter from a flash fire and fire suppression. A pressurized tank is filled with hydrated super absorbent polymer and connected to a conduit that is constructed and arranged to interchange various nozzles for personnel protection and fire suppression. The hydrated super absorbent polymer is discharged through a solenoid valve which can be operated by the individual operating within the space with a switch, an individual operating the control panel mounted in a utility truck or activated by a heat sensor in the confined space.

5 Claims, 2 Drawing Sheets

(56) References Cited

U.S. PATENT DOCUMENTS

| | | | |
|---|---|---|---|
| 3,857,446 A * | 12/1974 | Kenny | A62C 37/08 |
| | | | 137/468 |
| 3,861,473 A * | 1/1975 | Livingston | F16K 17/383 |
| | | | 169/19 |
| 4,356,870 A * | 11/1982 | Gaylord | A62C 35/58 |
| | | | 126/299 R |
| 4,978,460 A | 12/1990 | Von Blucher et al. | |
| 5,087,513 A | 2/1992 | Kim | |
| 5,190,110 A | 3/1993 | Von Blucher et al. | |
| 5,519,088 A | 5/1996 | Itoh et al. | |
| 5,849,210 A | 12/1998 | Pascente et al. | |
| 5,989,446 A | 11/1999 | Hicks et al. | |
| 6,029,751 A * | 2/2000 | Ford | A62C 35/023 |
| | | | 169/60 |
| 6,372,842 B1 | 4/2002 | Grisso et al. | |
| 6,834,728 B2 | 12/2004 | Demole | |
| 7,096,965 B2 | 8/2006 | Ozment | |
| 7,104,336 B2 | 9/2006 | Ozment | |
| 7,124,834 B2 | 10/2006 | Sundholm et al. | |
| 7,169,843 B2 | 1/2007 | Smith et al. | |
| 2008/0035354 A1 | 2/2008 | Cordani | |
| 2010/0059237 A1* | 3/2010 | Cordani | B64D 25/00 |
| | | | 169/54 |
| 2010/0319938 A1* | 12/2010 | Cordani | A62C 13/64 |
| | | | 169/30 |
| 2014/0202723 A1* | 7/2014 | Cordani | A62C 13/66 |
| | | | 169/62 |

* cited by examiner

FIRE SUPPRESSION FLUID DISPENSING DEVICE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/160,336, entitled "FIRE SUPPRESSION FLUID DISPENSING DEVICE", filed May 12, 2015. The contents of which the above referenced application is incorporated herein by reference.

FIELD OF THE INVENTION

This invention relates to the field of fire prevention, and more particularly to a conduit delivery assembly to permit dispersion of a hydrated super absorbent polymer around a ladder or in a confined space should a fire occur.

BACKGROUND OF THE INVENTION

In many cities the utilities are located beneath the surface of the earth, usually beneath the surface of the streets. These utilities are placed in tunnels or conduits. In the older cities, such as New York City, these utilities have been located in conduits for years or even decades. Over time the conduits which carry utilities may wear out and break. Further, electrical lines may simply be used beyond their use life as higher electrical loads are placed upon the lines. A serious problem is the failure of electrical feeder lines. These failures usually result in fires which must be quickly extinguished to prevent damage to the surrounding infrastructure.

While it is desirable to replace very old utilities in conduits and tunnels, it is not always practical. Due to financial restraints and other limitations, most of these electrical feeder lines have not been replaced. Unfortunately, failure of older electrical feeder lines can result in an electrical fire. These fires are commonly discovered when smoke is seen arising from manhole covers in the streets and sidewalks. It has been estimated by Consolidated Edison that there are approximately 40 electrical fires per day under the streets of New York City.

The cost of repairing and replacing the electrical feeder lines damaged by these fires is approximately $7,500.00 per linear foot of feeder line. Therefore, it is imperative that these fires be extinguished as quickly as possible. Inspection of lines can help pinpoint potential trouble areas. Unfortunately, inspection of the lines can trigger a fire. For instance, the opening of a manhole cover can provide the oxygen needed to support a fire. Similarly, a lineman performing an inspection may disturb a conduit resulting in arcing of electric lines, possibly triggering a fire.

Normally a lineman inspecting a potential problem area occurs while electrical power is still flowing through the lines. The inspection takes place within the manhole wherein a lineman inserts himself into the manhole. Typically a ladder is placed through the manhole and the lineman climbs down the ladder to permit inspection from within. Unfortunately the lineman can trigger a fire, or simply be in the wrong place at the wrong time. There have been many instances where a fire begins while the lineman is on the ladder. For instance, a fire may be smoldering as evidence by smoke coming out of the manhole. A lineman or fireman may then enter the manhole, and without notice, the smoldering may burst into an all encompassing fire. In many such instances, the individual who climbed into the manhole is now at risk of injury or death.

Another area of concern is the use of ladders for extracting people from burning buildings. Firemen do not hesitate to lean a ladder against a building to reach the lower floors in an effort to fight fires or extract survivors. Unfortunately such a situation cannot predict if a fire will erupt from a lower floor and engulf the firefighter while he/she is on the ladder. While the firefighter is likely prepared for a flash fire and is appropriately dressed, any survivor that they are pulling down the ladder will not be dressed should a fire approach the ladder area.

U.S. Pat. No. 6,834,728 discloses a system for extinguishing a fire in a tunnel. The system includes a conduit for delivering a fire extinguishing liquid and a trough extending parallel to the conduit for receiving liquid from the conduit. A carriage is arranged to move on a track which includes an upper edge of the trough. The carriage carries a pump having a nozzle, a video camera, and an inlet; each of which can be controlled robotically from a remote control station.

U.S. Pat. No. 7,096,965 discloses a method of proportioning a foam concentrate into a non-flammable liquid to form a foam concentrate/liquid mixture and create a flowing stream of the foam concentrate/liquid mixture. Nitrogen is introduced into the stream of the foam/liquid mixture to initiate the formation of a nitrogen expanded foam fire suppressant. The flowing stream carrying the nitrogen expanded foam is dispensed, which completes the full expansion of the nitrogen expanded foam fire suppressant, into the confined area involved in the fire, thereby smothering the fire and substantially closing off contact between combustible material involved in the fire and the atmosphere.

U.S. Pat. Nos. 7,096,965 and 7,104,336 disclose a method and apparatus for proportioning a foam concentrate into a non-flammable liquid to form a foam concentrate/liquid mixture.

U.S. Pat. No. 7,124,834 discloses a method for extinguishing a fire in a space such as a tunnel. The method includes spraying a fire extinguishing medium into the space by spray heads. In a first stage of the method, the flow and temperature of the hot gases produced by the fire are influenced by spraying an extinguishing medium into the space, especially by creating in the space at least one curtain of extinguishing medium.

U.S. Patent Publication No. 2008/0035354 is entitled "Water Based Fire Extinguishers", the contents of which are incorporated herein by reference, discloses a process for retarding or extinguishing conflagrations using a super absorbent polymer in water. The reaction of the water with the polymer creates a viscosity that can be readily pumped through a standard water based fire extinguisher, yet viscous enough to cover vertical and horizontal surfaces to act as a barrier to prevent fire from damaging such structures.

U.S. Pat. No. 7,169,843 discloses absorptive, cross-linked polymers which are based on partly neutralized, monoethylenically unsaturated monomers carrying acid groups, and with improved properties, which has a high gel bed permeability and high centrifuge retention capacity.

U.S. Pat. No. 5,989,446 discloses a water additive for use in fire extinguishing and prevention. The additive comprises a cross-linked water-swellable polymer in a water/oil emulsion. The polymer particles are dispersed in an oil emulsion wherein the polymer particles are contained within discrete water "droplets" within the oil.

U.S. Pat. No. 5,190,110 discloses the fighting of fires or protection of objects from fire by applying water which comprises dispersing in the water particles of a cross-linked, water-insoluble, but highly water-swellable, acrylic acid derivative polymer in an amount insufficient to bring the viscosity above 100 mPa's.

U.S. Pat. No. 5,849,210 discloses a method of preventing or retarding a combustible object from burning including the steps of mixing water with a super absorbent polymer ("SAP") to form one at least partially hydrated SAP, and applying the at least partially hydrated SAP to the combustible object, before or after combustion.

U.S. Pat. No. 6,372,842 discloses methods of using an aqueous composition or dispersion containing a water-soluble or water-dispersible synthetic polymer, and compositions formed thereof.

U.S. Pat. No. 5,087,513 discloses polybenzimidazole polymer/superabsorbent polymer particles. These articles are prepared by either mixing the super absorbent polymer particulates with the polybenzimidazole polymer solution during the formation of the polybenzimidazole article, or forming a composite of a polybenzimidazole film or fiber material layer with a super absorbent polymer particulate containing layer. These polybenzimidazole products absorb large amounts of fluid while retaining the flame retardancy and chemical unreactivity of conventional polybenzimidazole materials.

U.S. Pat. No. 4,978,460 discloses a particulate additive for water for firefighting containing a strongly swelling water-insoluble high molecular weight polymer as gelatinizing agent, which comprises a water-soluble release agent which causes the particles of said gelatinizing agent not to swell, the particles of the gelatinizing agent being encased or dispersed in the release agent.

U.S. Pat. No. 5,519,088 discloses an aqueous gel comprising a polymer of (meth)acrylamide or particular (meth) acrylamide derivative(s), particulate metal oxide(s) and an aqueous medium, a process for producing said gel, and products utilizing said gel.

What is needed is a device for deployment of a fire suppressant liquid in a confined space that provides fire protection and suppression to the immediate area around the device.

SUMMARY OF THE INVENTION

An assembly for having provisions for protecting an individual by suppressing a fire in manhole or in an area where a fire may occur, such as in firefighting situations. The invention is configured for positioning spray nozzles for use in distributing a hydrated super absorbent polymer in a manhole in the event of a fire, including the encompassing of any individual. The conduit includes a quick disconnect hookup to allow for a choice of multiple modes of fire protection to be used. The hydrated super absorbent polymer can be manually discharged by operating the valve handle at the gel tank or by activating a solenoid, either manually or remotely by use of an electric solenoid triggered by an actuator or triggered by automatically by heat sensors positioned within the manhole.

The hydrated super absorbent polymer has substantially superior fire suppression and extinguishing properties than the fire suppression and extinguishing properties of plain water. One of the unique properties of the admixture is its ability to cling to objects to which it has been applied and both cool down the object after it is on fire and create a block to inhibit fire from spreading over the object. The hydrated super absorbent polymer mixture has a viscosity and is distributed in a manner to be contained within a specific area without spreading to adjacent areas. These superior properties enable fires, including electrical fires, to be extinguished more rapidly and not flare back up. The hydrated super absorbent polymer provides a non-conductive environment and the polymer can encapsulate noxious and toxic gases produced by electrical fires. The admixture is capable of retaining ash, particulates, and other byproducts of the electrical fire to enable a rapid and thorough cleanup. The admixture is also capable of protecting an individual's skin from exposure to fire.

Accordingly, it is an objective of the instant invention to provide a portable dispensing assembly for use in areas that might be subject to flash fires.

It is an objective of the present invention to provide an assembly having strategically positioned spray nozzles and a volume of fire suppression material calculated to provide the individual time to extract themselves from the manhole.

It is still a further objective of the present invention to provide an individual a means to activate the system from any point in the manhole.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
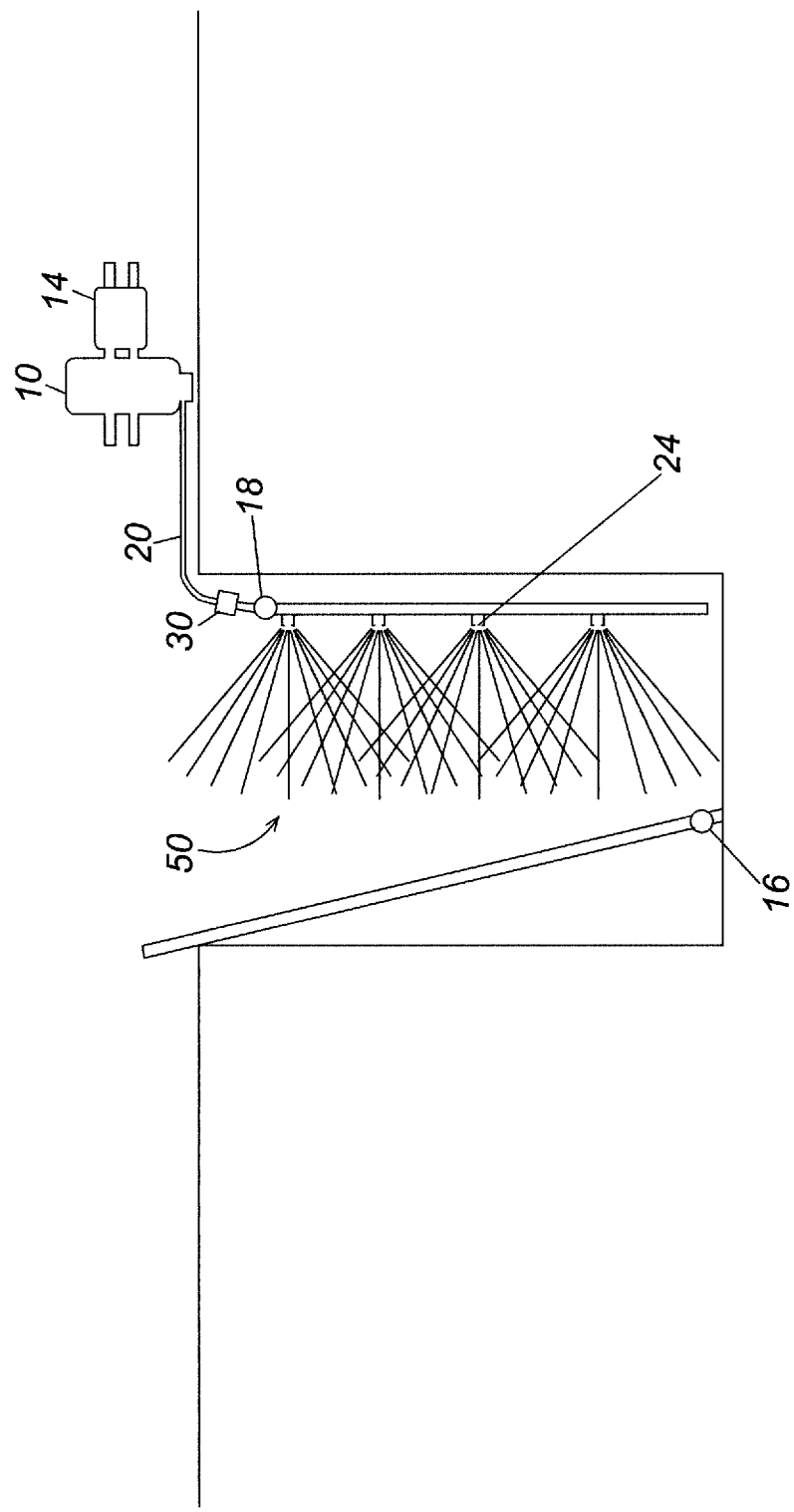
FIG. 1 is a pictorial view of the present invention.
Figure 2:
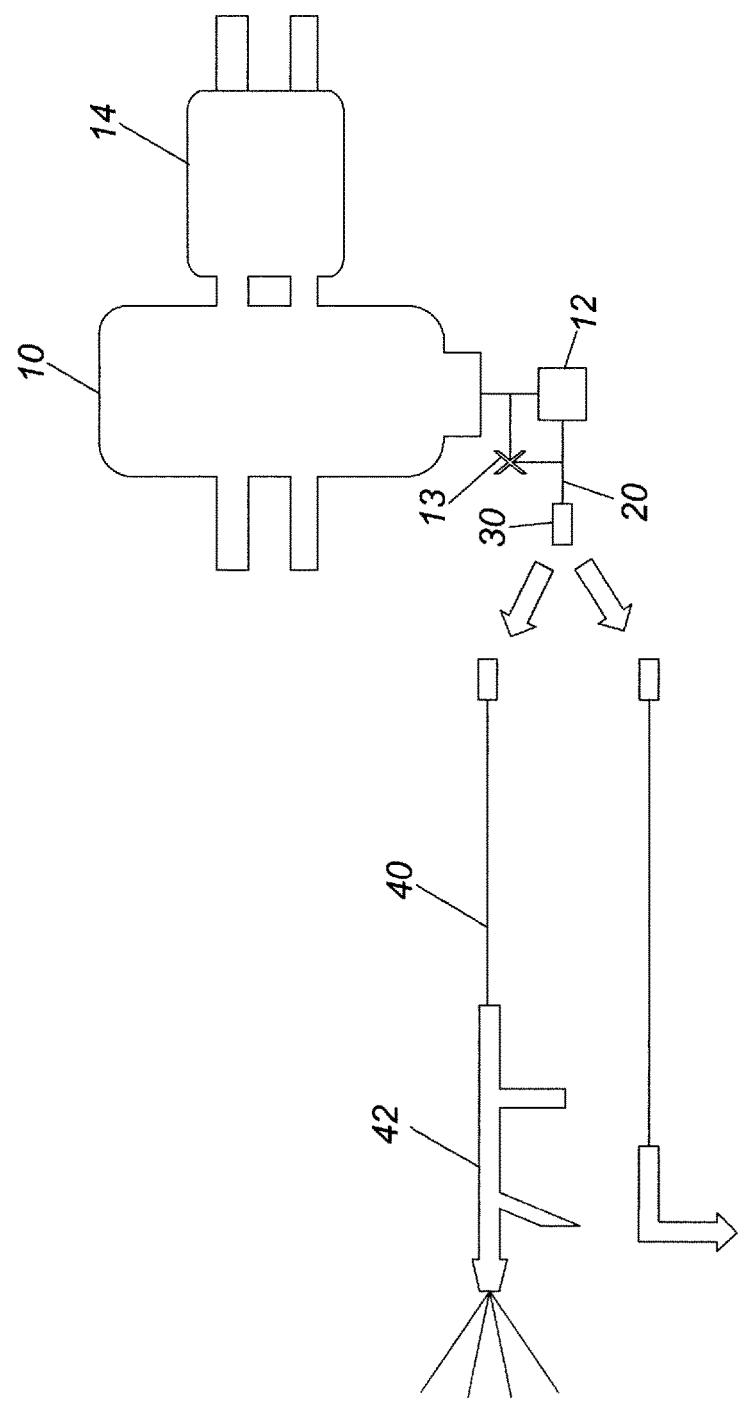
FIG. 2 a pictorial view of an alternative embodiment of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention relates to a unique technique for suppressing fires. This unique technique utilizes a fire suppressant in an amount sufficient to suppress or extinguish an electrical fire. The present invention utilizes one or more fire suppressant compositions. The fire suppressant compositions can be any known fire suppressants, including biodegradable, super absorbent, aqueous based polymers. Examples of these polymers are cross-linked modified polyacrylamides/potassium acrylate or polyacrylamides/sodium acrylate. Other suitable polymers include, albeit not limited to, carboxy-methylcellulose, alginic acid, cross-linked starches, and cross-linked polyaminoacids. Know fire suppressants marketed under the brand name of FIREICE, CEMDAL AQUA SHIELD, BARRICADE, THERMO-GEL, WILDFIRE AFG FIREWALL, BIOCENTRAL BLAZETAMMER, PHOS-CHEK INSUUL, and THERMO GEL. As used herein, a "fire suppressant" composition is meant to be inclusive of all components of the composition. In some embodiments, the fire suppressant composition comprises one or more fire suppressant compounds. In other embodiments, the fire suppressant composition comprises one or more common components of fire suppressant formulations, such as: fire suppressant salts, conventional fire suppressants, corrosion inhibitors, spoilage inhibitors, foaming agents, non foaming agents, flow conditioners, stability additives, thickening agents, conventional fire suppressants, pigments, dyes or the like. In some embodiments, the fire suppressant or compositions thereof is in dry form. In other embodiments, the fire suppressant or compositions thereof are hydrated. The fire suppressant or compositions thereof can be a liquid, foam, or semi-liquid form, such as, for example, gel having varying viscosities.

In some embodiments, a conventional fire suppressant comprises penta-bromodiphenyl ether, octa-bromodiphenyl ether, deca-bromodiphenyl ether, short-chain chlorinated paraffins (SCCPs), medium-chain chlorinated paraffins (MCCPs), hexabromocyclododecane (HBCD), tetrabromobisphenol A (TBBPA), tetrabromobisphenol A ether, pentabromotoluene, 2,3-dibromopropyl-2,4,6-tribromophenyl ether, tetrabromobisphenol A, bis(2,3-dibromopropylether), tris(tribromophenoxy)triazine, tris(2-chloroethyl)phosphate (TCEP), tris(2-chloro-1-methylethyl)phosphate (TCPP or TMCP), tris (1,2-dichloropropyl)phosphate (TDCP), 2,2-bis (chloromethyl)-trimethylene bis(bis(2-chloroethyl)phosphate), melamine cyanurate, antimony trioxide $Sb_2O_3$ (ATO), boric acid, ammonium polyphosphate (APP), aluminum ammonium polyphosphate, aluminum hydroxide, magnesium hydroxide red phosphorous, 1,2-bis(tribromophenoxy)ethane, 2,4,6-tribromophenyl glycidyl ether, tetrabromo phthalic anhydride, 1,2-bis(tetrabromo phthalimide) ethane, tetrabromo dimethyl phthalate, tetrabromo disodium phthalate, decabromodiphenyl ether, tetradecabromodi(phenoxyl)benzene, 1,2-bis(pentabromophenyl)ethane, bromo-trimethyl-phenyl-hydroindene, pentabromobenzyl acrylate, pentabromobenzyl bromide, hexabromobenzene, pentabromotoluene, 2,4,6-tribromophenyl maleimide, hexabromo cyclododecane, N,N'-1,2-bis(dibromonorbornyl dicarbimide) ethane, pentabromochloro-cyclohexane, tri(2,3-dibromopropyl)isocyanurate, bromo-styrene copolymer, tetrabromobisphenol A-carbonate oligomer, polypentabromobenzyl acrylate, polydibromophenylene ether; chlorinated flame retardants such as: dechlorane plus, HET anhydride (chlorendic anhydride), perchloro pentacyclodecane, tetrachloro bisphenol A, tetrachlorophthalic anhydride, hexachlorobenzene, chlorinated polypropylene, chlorinated polyvinyl chloride, vinyl chloride-vinylidene chloride copolymer, chlorinated polyether, hexachloroethane; organic phosphorus flame retardants such as: 1-oxo-4-hydroxymethyl-2,6,7-trioxa-1-phosphabicyclo[2,2,2]octane, 2,2-dimethyl-1,3-propanediol-di(neopentyl glycol)diphosphate, 9,10-dihydro-9-oxa-10-phosphaphenanthrene-10 oxide, bis (4-carboxyphenyl)-phenyl phosphine oxide, bis(4-hydroxyphenyl)-phenyl phosphine oxide, phenyl(diphenyl sulfone) phosphate oligomer; phosphorus-halogenated flame retardants such as tris(2,2-di(bromomethyl)-3-bromopropyl) phosphate, tris(dibromophenyl)phosphate, 3,9-bis(tribromophenoxy)-2,4,8,10-tetraoxa-3,9-diphosphaspiro[5,5]-3,9-di-oxo-undecane, 3,9-bis(pentabromophenoxy)-2,4,8,10-tetraoxa-3,9-diphosphaspiro[5,5]-3,9-dioxo-undecane, 1-oxo-4-tribromophenoxycarbonyl-2,6,7-trioxa-1-phosphabicyclo[2,2,2]octane, p-phenylene-tetrakis(2,4,6-tribromophenyl)-diphosphate, 2,2-di(chloromethyl)-1,3-propanediol-di(neopentyl glycol)diphosphate, 2,9-di(tribromoneopentyloxy)-2,4,8,10-tetraoxa-3,9-diphosphaspiro[5,5]-3-,9-dioxo-undecane; nitrogen-based flame retardants or phosphorus-nitrogen-based flame retardants such as melamine, melamine cyanurate, melamine orthophosphate, dimelamine orthophosphate, melamine polyphosphate, melamine borate, melamine octamolybdate, cyanuric acid, tris(hydroxyethyl)isocyanurate, 2,4-diamino-6-(3,3,3-trichloro-propyl)-1,3,5-triazine, 2,4-di(N-hydroxymethylamino)-6-(3,3,3-trichloro-propyl-1,3,5-triazine), diguanidine hydrophosphate, guanidine dihydrogen phosphate, guanidine carbonate, guanidine sulfamate, urea, urea dihydrogen phosphate, dicyandiamide, melamine bis(2,6,7-trioxa-phospha-bicyclo[2.2.2]octane-1-oxo-4-methyl)-hydroxy-phosphate, 3,9-dihydroxy-3,9-dioxo-2,4,8,10-tetraoxa-3,9-diphosphaspiro[5.5]undecane-3,9-dimelamine, 1,2-di(2-oxo-5,5-dimethyl-1,3-dioxa-2-phosphacyclohexyl-2-amino) ethane, N,N'-bis(2-oxo-5,5-dimethyl-1,3-dioxa-2-phosphacyclohexyl)-2,2'-m-phenylenediamine, tri(2-oxo-5,5-dimethyl-1,3-dioxa-2-phosphacyclohexyl-2-methyl) amine, hexachlorocyclotriphosphazene; and inorganic flame retardants such as: red phosphorus, ammonium polyphosphate, diammonium hydrophosphate, ammonium dihydrogen phosphate, zinc phosphate, aluminum phosphate, boron phosphate, antimony trioxide, aluminum hydroxide, magnesium hydroxide, hydromagnesite, alkaline aluminum oxalate, zinc borate, barium metaborate, zinc oxide, zinc sulfide, zinc sulfate heptahydrate, aluminum borate whisker, ammonium octamolybdate, ammonium heptamolybdate, zinc stannate, stannous oxide, stannic oxide, ferrocenc, ferric acetone, ferric oxide, ferro-ferric oxide, ammonium bromide, sodium tungstate, potassium hexafluorotitanate, potassium hexafluorozirconate, titanium dioxide, calcium carbonate, barium sulfate, sodium bicarbonate, potassium bicarbonate, cobalt carbonate, zinc carbonate, basic zinc carbonate, heavy magnesium carbonate, basic magnesium carbonate, manganese carbonate, ferrous carbonate, strontium carbonate, sodium potassium carbonate hexahydrate, magnesium carbonate, calcium carbonate, dolomite, basic copper carbonate, zirconium carbonate, beryllium carbonate, sodium sesquicarbonate, cerium carbonate, lanthanum carbonate, guanidine carbonate, lithium carbonate, scandium carbonate, vanadium carbonate, chromium carbonate, nickel carbonate, yttrium carbonate, silver carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, lutetium carbonate, aluminum diacetate, calcium acetate, sodium bitartrate, sodium acetate, potassium acetate, zinc acetate, strontium acetate, nickel acetate, copper acetate, sodium oxalate, potassium oxalate, ammonium oxalate, nickel oxalate, manganese oxalate dihydrate, iron nitride, sodium nitrate, magnesium nitrate, potassium nitrate, zirconium nitrate, calcium dihydrogen phosphate, sodium dihydrogen phosphate, sodium dihydrogen phosphate dihydrate, potassium dihydrogen phosphate, aluminum dihydrogen phosphate, ammonium dihydrogen phosphate, zinc dihydrogen phosphate, manganese dihydrogen phosphate, magnesium dihydrogen phosphate, disodium hydrogen phosphate, diammonium hydrogen phosphate, calcium hydrogen phosphate, magnesium hydrogen phosphate, ammonium phosphate, magnesium ammonium phosphate, ammonium polyphosphate, potassium metaphosphate, potassium tripolyphosphate, sodium trimetaphosphate, ammonium hypophosphite, ammonium dihydrogen phosphite, manganese phosphate, dizinc hydrogen phosphate, dimanganese hydrogen phosphate, guanidine phosphate, melamine phosphate, urea phosphate, strontium dimetaborate hydrogen phosphate, boric acid, ammonium pentaborate, potassium tetraborate octahydrate, magnesium metaborate octahydrate, ammonium tetraborate tetrahydrate, strontium metaborate, strontium tetraborate, strontium tetraborate tetrahydrate, sodium tetraborate decahydrate, manganese borate, zinc borate, ammonium fluoroborate, ammonium ferrous sulfate, aluminum sulfate, potassium aluminum sulfate, ammonium aluminum sulfate, ammonium sulfate, magnesium hydrogen sulfate, aluminum hydroxide, magnesium hydroxide, iron hydroxide, cobalt hydroxide, bismuth hydroxide, strontium hydroxide, cerium hydroxide, lanthanum hydroxide, molybdenum hydroxide, ammonium molybdate, zinc stannate, magnesium trisilicate, telluric acid, manganese tungstate, manganite, cobaltocene, 5-aminotetrazole, guanidine nitrate, azobisformamide, nylon powder, oxamide, biuret, pentaerythritol, decabromodiphenyl ether, tetrabromophthalic anhydride, dibromoneopentyl glycol, potassium citrate, sodium citrate, manganese citrate, magnesium citrate, copper citrate, ammonium citrate, nitroguanidine.

Referring to the Figures, the present invention is a portable fluid dispensing assembly which can be used to protect personnel that are within a manhole or otherwise in a position where a flash fire may occur. Electrical fires present different and unique problems pertaining to how these fires should be suppressed. Water is normally used to fight fires because it can quickly cool down the burning material. However, water and electricity are harmful, if not deadly to individuals, when brought into contact with each other. Normally, when water hits an active electrical circuit, it shorts out the circuit which usually results in destruction of the circuit. Further, when individuals are in close proximity to the water contacting the electricity, there is a strong likelihood that the water will act as a conductor and conduct the electricity to the individuals, resulting in serious injury or death of the individuals. Since water spreads rapidly in all directions on surfaces, electricity which comes in contact with the water will be conducted to wherever the water flows. Because it is difficult to prevent water from flowing to certain areas, there is a strong likelihood that individuals will be injured or killed when they come in contact with this water.

In the preferred embodiment of the present invention, a gel form of the hydrated super absorbent polymer, are utilized having properties which enable the hydrated super absorbent polymer when applied to remain within the confined area because of its relatively high viscosity. The properties of the gel, in particular its viscosity, also enable the gel when applied to remain on vertical, horizontal, and curved surfaces of the ladder used by the individual to enter the manhole or other situations where a fire may occur. Unlike pure water, the material does not provide an electrically conductive path permitting the individual time to get out of the manhole without being electrocuted directly or indirectly should a metallic ladder be employed. The present invention adds a predetermined amount of the super absorbent polymer to a predetermined amount of water to obtain an admixture which has properties that enable the admixture to suppress the spread of an electrical fire and extinguish any fire that has attached itself to the individual. The preferred predetermined amounts are 2-4 pounds of dry super absorbent polymer to 30 gallons of water. The super absorbent polymer can be added to a given volume of water and the resulting admixture pumped to a location to suppress the spread of and extinguish electrical fires. The adherence of the admixture of super absorbent polymer and water to the clothing of the individual lowers the temperature of the clothing below a combustion temperature thereby giving the individual time to exit the manhole. In addition, adherence of the admixture of super absorbent polymer and water to the clothing maintains moisture content at a level which suppresses the spread of the fire by preventing combustion of the clothing from hot embers and/or flames. Further, placing the admixture upon exposed skin deters burning of the skin.

Currently, firefighters apply water to the electrical conduits/components which are on fire and also to adjacent conduits/components. Because it is difficult to control where the water goes, the contact of water on electrical conduits/components which are not on fire results in substantial unnecessary damage to these conduits/components. The present invention, on the other hand, enables a controlled dispersion of super absorbent polymer water mixture to a specific area for the primary purpose of protecting the individual from the fire, and giving the individual time to escape the manhole. The mixture adheres to the individual and the ladder, without affecting adjacent conduits/components. Thus, a substantial safety factor is gained because electrical conduits/components are not sprayed and, if they are sprayed, the admixture is not conductive like water.

Besides the risk of electrocution from using only water to protect an individual in an electrical fire, water will not suppress the noxious and/or toxic gases produced by burning electrical wires, insulation and other components. However, the admixture of super absorbent polymer and water of the present invention has physical and chemical properties which enable the admixture to entrap and retain the noxious and/or toxic gasses and prevent the release of these gases into the atmosphere. This is an important advantage that the present invention has over the prior art because it prevents the noxious and/or toxic gases from reaching and affecting the individuals during the time needed to escape the fire.

Referring now to the Figures, disclosed is a fire suppression fluid dispensing assembly. The invention is a fluid dispensing assembly constructed and arranged to provide fire suppression and personal protection for an individual on a ladder or in a manhole. In a preferred embodiment, the invention is configured to be portable and installed inside a utility truck.

The assembly includes at least one container 10 having a predetermined amount of hydrated super absorbent polymer and compressed gas. In a preferred embodiment, the container 10 is always charged with a predetermined amount of compressed gas required for complete discharge of the hydrated super absorbent polymer. The container has an outlet that includes at least one valve positioned in the line.

A conduit 20 is fluidly connected to the storage container 10 and is constructed and arranged to be positioned in a confined space such as a manhole. In one embodiment, the conduit 20 has a plurality of orifices 24 constructed and arranged to deliver a predetermined amount of said hydrated super absorbent polymer. The plurality of orifices 24 can function as nozzles or spray nozzles can be fitted into the orifices 24. The plurality of orifices 24 are arranged to provide overlapping spray patterns 50 of said hydrated super absorbent polymer.

In an alternate embodiment, conduit 20 has a manually releasable coupler 30. The section of conduit 20 with the plurality of orifices 24 can easily be connected and disconnected for ease of operation and portability. Additionally, the manually releasable coupler 30 is constructed and arranged to cooperate with a nozzle 42 and a hose 40. The manually releasable coupler 30 allows a choice of multiple modes of fire protection to be used without deviating from the scope of the invention.

A control valve 12 is positioned between the pressurized storage container 10 and the conduit 20. The control valve 24 is operable to allow the hydrated super absorbent polymer to be delivered to the conduit 20 for dispensing. In a preferred embodiment, the control valve 12 is an electrically actuated solenoid with a manual override operated by an electric actuating switch. The solenoid in includes an RF receiver and each actuating switch is an RF transmitter. One electric actuating switch 14 can be located in a fire alarm panel that is mounted within a utility truck, for example. Another electric actuating switch 16, may be located within the confined space by attaching to a ladder, as an example.

Another actuating switch 18 is positioned in an optimal location and is thermally operated upon the presence of high temperatures. In a preferred embodiment, the actuating switch 18 is a fixed temperature detector with no thermal lag.

The discharge side of the container 10 also has a manually operated bypass valve 13 that can be operated by an individual that is not operating in the manhole. In a preferred embodiment, the manually operated bypass valve 13 is spring operated mechanism that fails closed. This is to insure that the container 10 is not accidentally discharged as the bypass valve requires an operator to hold it open.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fire suppression fluid dispensing assembly for deployment in a manhole comprising:
    a storage container holding a predetermined amount of electrically non-conductive hydrated super absorbent polymer, said hydrated super absorbent polymer mixed in the ratio of 2-4 pounds of dry super absorbent polymer per 30 gallons of water installed in a utility truck;
    a conduit fluidly connected to said storage container;
    said conduit having a manually releaseable coupler extending between the utility truck and the manhole;
    a control valve positioned between said storage container and said conduit, said control valve including a solenoid providing a RF (radio frequency) receiver with a first actuating switch constructed and arranged to manually send an RF signal to said RF receiver from a location within the manhole;
    a second actuating switch constructed and arranged to manual send an RF signal to said RF receiver from a location within the utility truck; and
    a third actuating switch constructed and arranged to automatically send an RF signal to said RF receiver from a fixed temperature detector with no thermal lag location within the manhole; said solenoid operable to allow said hydrated super absorbent polymer to be delivered through said conduit for dispensing within the manhole.

2. The fluid dispensing assembly according to claim 1, wherein said manually releasable coupler is constructed and arranged to cooperate with a nozzle.

3. The fluid dispensing assembly according to claim 1, wherein said manually releasable coupler is constructed and arranged to cooperate with a hose.

4. The fluid dispensing assembly according to claim 1 wherein said solenoid valve is operated by a remote actuating switch.

5. The fluid dispensing assembly according to claim 1 wherein said hydrated super absorbent polymer admixture entraps and retains noxious and toxic gasses thereby preventing the release of these gases into the atmosphere.

* * * * *